US009068474B2

(12) United States Patent
Cowgill

(10) Patent No.: US 9,068,474 B2
(45) Date of Patent: Jun. 30, 2015

(54) TURBINE HOUSING

(71) Applicant: GM GLOBAL TECHNOLOGY OPERATIONS LLC, Detroit, MI (US)

(72) Inventor: Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/750,291

(22) Filed: Jan. 25, 2013

(65) Prior Publication Data
US 2014/0212278 A1   Jul. 31, 2014

(51) Int. Cl.
| F02B 23/00 | (2006.01) |
| F02B 33/44 | (2006.01) |
| F02B 33/00 | (2006.01) |
| F01B 25/02 | (2006.01) |
| F04D 29/44 | (2006.01) |
| F01D 25/16 | (2006.01) |
| F02C 6/12 | (2006.01) |
| F01D 17/10 | (2006.01) |
| F02B 37/00 | (2006.01) |
| F02B 37/007 | (2006.01) |
| F02B 37/18 | (2006.01) |

(52) U.S. Cl.
CPC .............. F01D 25/162 (2013.01); F02C 6/12 (2013.01); *F05D 2220/40* (2013.01); F01D 17/105 (2013.01); F02B 37/002 (2013.01); F02B 37/007 (2013.01); F02B 37/18 (2013.01); *Y02T 10/144* (2013.01)

(58) Field of Classification Search
USPC ............ 60/612; 123/562; 415/144, 145, 184, 415/203, 204, 205
See application file for complete search history.

(56) References Cited

U.S. PATENT DOCUMENTS

| 4,294,073 | A | * | 10/1981 | Neff ................................. 60/597 |
| 4,490,622 | A | * | 12/1984 | Osborn ........................... 290/52 |
| 4,617,799 | A | * | 10/1986 | Todokoro et al. ............... 60/602 |
| 5,673,559 | A | * | 10/1997 | Benson ........................... 60/602 |
| 6,256,993 | B1 | * | 7/2001 | Halimi et al. ................... 60/608 |
| 7,269,950 | B2 | * | 9/2007 | Pedersen et al. ................ 60/602 |
| 7,363,761 | B1 | * | 4/2008 | Dickerson ....................... 60/602 |
| 7,428,814 | B2 | * | 9/2008 | Pedersen et al. ................ 60/602 |
| 8,499,559 | B2 | * | 8/2013 | Axelsson et al. ............... 60/612 |
| 2003/0230085 | A1 | * | 12/2003 | Sumser et al. .................. 60/602 |
| 2004/0200215 | A1 | * | 10/2004 | Woollenweber et al. ....... 60/407 |
| 2005/0086936 | A1 | * | 4/2005 | Bucknell et al. ................ 60/602 |
| 2008/0196409 | A1 | * | 8/2008 | Goebelbecker et al. ........ 60/612 |
| 2010/0024416 | A1 | * | 2/2010 | Gladden et al. ............... 60/605.2 |
| 2010/0229551 | A1 | * | 9/2010 | Wu et al. ....................... 60/605.1 |
| 2011/0088393 | A1 | * | 4/2011 | Romblom et al. ........... 60/605.2 |

* cited by examiner

*Primary Examiner* — Thomas Denion
*Assistant Examiner* — Jessica Kebea
(74) *Attorney, Agent, or Firm* — Cantor Colburn LLP

(57) ABSTRACT

A turbine housing comprises an exhaust port flange, a turbine discharge flange, a crossover flange, and a bearing support ring. The exhaust port flange is configured for mechanically coupling the turbine housing to a mating structure providing a source of working fluid. The turbine discharge flange is configured for mechanically coupling the turbine housing to an exhaust system. The crossover flange is configured for mechanically coupling the turbine housing to a crossover duct. The bearing support ring is configured for mechanically supporting a bearing, on which a turbine output shaft is supported. The turbine housing defines an inlet plenum, a turbine shroud, and a discharge vent. The exhaust port flange defines an inlet port configured to provide fluid communication between the inlet plenum and the source of working fluid. The turbine shroud defines a fluid expansion flow path for expansion of the stream of working fluid.

7 Claims, 3 Drawing Sheets

TURBINE HOUSING

FIELD OF THE INVENTION

The subject invention relates to turbo-charging systems for internal combustion engines and, more particularly, to a turbine housing for a parallel-sequential turbo-charging system.

BACKGROUND

In modern internal combustion engines, complex turbo-charging architectures are gaining importance in the effort to reduce engine displacements while maintaining or increasing power output. Demands for acceptable engine transient response, fuel economy, and lowered emissions can complicate design challenges for engine manufacturers. Parallel sequential charging systems are the most attractive for multi-bank engines from a cost and packaging perspective but still face packaging and cost challenges compared to single stage charging systems.

Attempts to meet these simultaneous challenges have included incorporating a plurality of turbo-charging components (e.g., twin turbo-chargers) each being dedicated to an associated bank of engine cylinders (i.e., cylinder banks). Further developments have included providing fluid coupling among the exhaust systems of separate engine cylinder banks. Unfortunately, however, as a desire has arisen to integrate conventional exhaust manifold components into the cylinder head, access to the separate exhaust streams upstream of turbo-machinery to provide exhaust communication between separate engine banks has become especially complicated and has resulted in increased cost.

Accordingly, it is desirable to have an improved turbine housing for use in a parallel-sequential turbo-charging system providing for reduced cost, complexity, and component count of the parallel-sequential turbo-charging system while facilitating its use with engines having integrated exhaust system architectures.

SUMMARY OF THE INVENTION

In one exemplary embodiment of the invention, a primary turbine housing comprises an exhaust port flange, a turbine discharge flange, a crossover flange, and a bearing support ring. The exhaust port flange is configured for mechanically coupling the primary turbine housing to a primary mating structure for providing a primary source of working fluid. The turbine discharge flange is configured for mechanically coupling the primary turbine housing to an exhaust system. The crossover flange is configured for mechanically coupling the primary turbine housing to a crossover duct. The bearing support ring is configured for mechanically supporting a bearing, on which a turbine output shaft is supported for rotation about its longitudinal axis.

In accordance with this embodiment, the primary turbine housing defines an inlet plenum, a turbine shroud, and a discharge vent. The exhaust port flange defines a primary inlet port that is configured to provide fluid communication between the inlet plenum and the primary source of working fluid. The primary inlet port is configured to convey a primary stream of working fluid from the primary source of working fluid to the inlet plenum. The turbine shroud defines a fluid expansion flow path for expansion of the primary stream of working fluid between a turbine inlet and a turbine exit.

In another exemplary embodiment of the invention, an internal combustion engine comprises a first cylinder bank, a primary exhaust manifold for conveying exhaust gas produced in the first cylinder bank; and a primary turbine housing. The primary turbine housing comprises an exhaust port flange, a turbine discharge flange, a crossover flange, and a bearing support ring. The exhaust port flange is configured for mechanically coupling the primary turbine housing to the primary exhaust manifold, which is configured to provide exhaust gas produced in the first cylinder bank as a primary source of working fluid. The turbine discharge flange is configured for mechanically coupling the primary turbine housing to an exhaust system. The crossover flange is configured for mechanically coupling the primary turbine housing to a crossover duct; and the bearing support ring is configured for mechanically supporting a bearing, on which a turbine output shaft is supported for rotation about its longitudinal axis.

In accordance with this embodiment, the primary turbine housing defines an inlet plenum, a turbine shroud, and a discharge vent. The exhaust port flange defines a primary inlet port that is configured to provide fluid communication between the inlet plenum and the primary source of working fluid. The primary inlet port is configured to convey a primary stream of working fluid from the primary source to the inlet plenum, and the turbine shroud defines a fluid expansion flow path for expansion of the primary stream of working fluid between a turbine inlet and a turbine exit.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
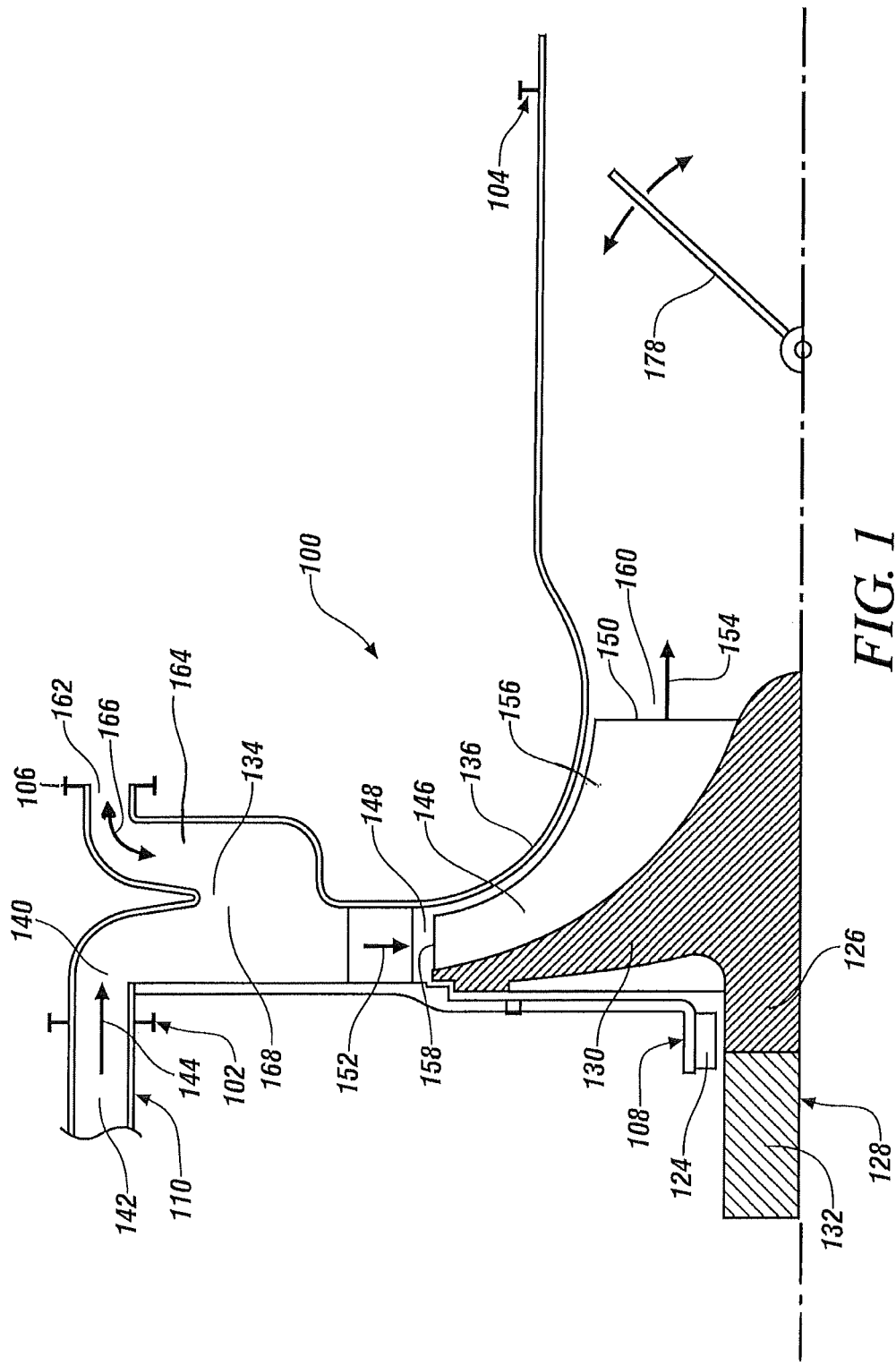
FIG. 1 is a cutaway drawing showing an exemplary turbine housing.

The following description is merely exemplary in nature and is not intended to limit the present disclosure, its application or uses. It should be understood that throughout the drawings, corresponding reference numerals indicate like or corresponding parts and features.

Figure 2:
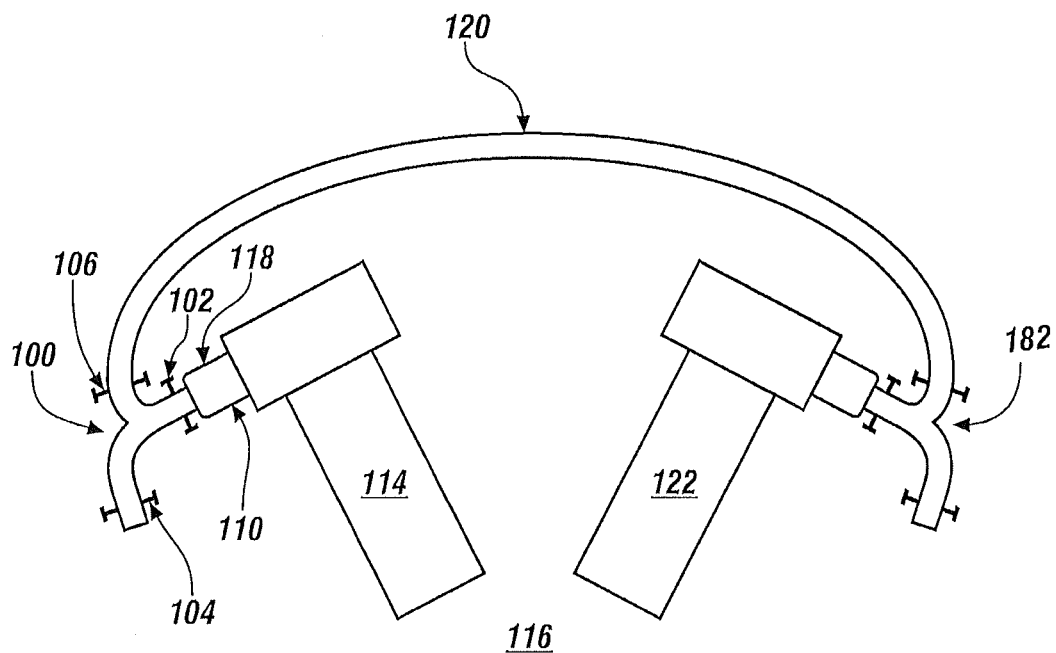
FIG. 2 is a schematic drawing showing an exemplary parallel-sequential turbo-charging system.

In accordance with an exemplary embodiment of the invention, FIG. 1 and FIG. 2 show an exemplary primary turbine housing 100. As shown in FIG. 1, a primary turbine housing 100 includes an exhaust port flange 102, a turbine discharge flange 104, a crossover flange 106, and a bearing support ring 108. The exhaust port flange 102 is configured for mechanically coupling the primary turbine housing 100 to a primary mating structure 110, which serves as a primary source 142 of working fluid such as engine exhaust gas or other pressurized fluid that may be expanded through a turbine to generate useful work. For example, the primary mating structure 110 may be an exhaust flange of an exhaust manifold (not shown). The primary mating structure 110 may also be an exhaust flange of a cylinder head that has an exhaust manifold integrated therein (i.e., an integrated exhaust manifold or IEM).

In either case, the mating structure 110 may be associated with a first cylinder bank 114 of a host engine 116.

It will be appreciated that the integration of an exhaust manifold into a cylinder head casting may be desirable in some engine applications where it is desirable or advantageous to reduce engine size, weight, and cost. By combining the exhaust manifold with the cylinder head into a single casting, an IEM/cylinder head may enable elimination of a cast iron exhaust manifold, bolts, gasket and heat shield. Further, the reliability of the engine and exhaust system is advantageously improved because the potential for a gasket failure (i.e., leakage) between the traditional head and exhaust manifold is eliminated.

The turbine discharge flange 104 is configured for mechanically coupling the primary turbine housing 100 to an exhaust system 118, which serves to convey the working fluid, following its passage through the primary turbine housing 100, to a location where it may be discharged to the atmosphere. Accordingly, the exhaust system 118 may include one or more exhaust after-treatment components (not shown) such as a catalytic converter or a particulate filter.

Figure 4:
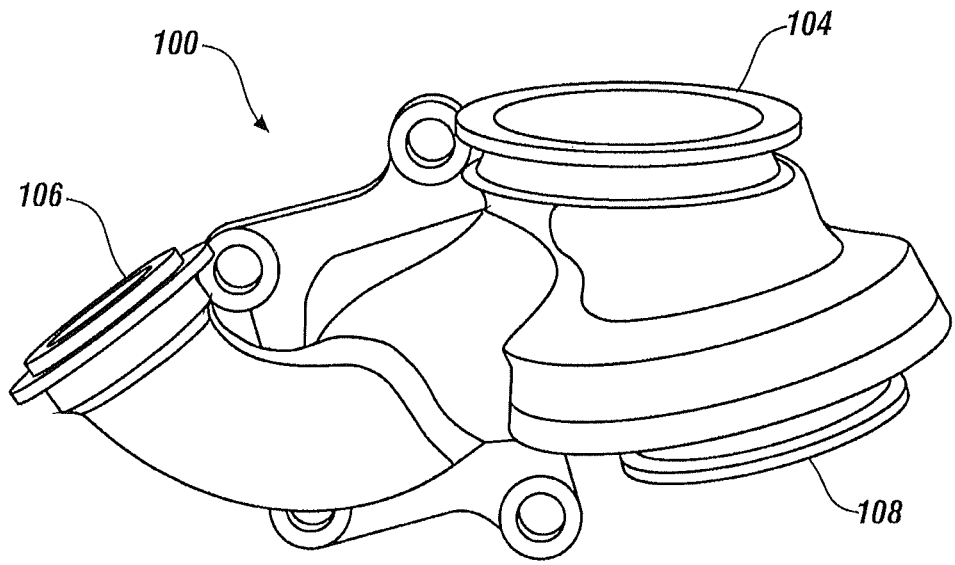
FIG. 4 is a drawing showing an external view of exemplary turbine housing.

The crossover flange 106 is configured for mechanically coupling the primary turbine housing 100 to a crossover duct 120. The crossover duct 120 may be mechanically coupled to a secondary mating structure, with the secondary mating structure being configured to provide a secondary source of working fluid. For example, as shown schematically in FIG. 2 and with further reference to FIG. 4, the crossover duct 120 may be mechanically coupled to a secondary turbine housing 182, and may be configured to provide for fluid coupling, directly or indirectly, between the primary turbine housing 100 and the secondary source of working fluid. In an exemplary embodiment, the secondary source of working fluid is a second cylinder bank 122 of the host engine 116. Accordingly, the crossover duct 120 may provide a communication path between engine banks in a multi-bank engine 116.

The bearing support ring 108 is configured for mechanically supporting a bearing 124, on which a turbine output shaft 126 is supported for rotation about its longitudinal axis 128. The turbine output shaft 126 is mechanically coupled to a turbine wheel 130 that is disposed within the primary turbine housing 100. The turbine output shaft 126 may also be mechanically coupled to a compressor shaft 132 for driving a compressor (not shown), which interacts with, and compresses, an inlet steam of air (not shown) for combustion within the host engine 116.

Internally, the primary turbine housing 100 defines an inlet plenum 134, a turbine shroud 136, and a discharge vent 138. The exhaust port flange 102 defines a primary inlet port 140 that is configured to provide fluid communication between the inlet plenum 134 and a primary source 142 of working fluid provided within the primary mating structure 110. Accordingly, the primary inlet port 140 is configured to convey a primary stream 144 of working fluid from the primary source 142 to the inlet plenum 134. In an exemplary embodiment, the primary stream 144 comprises exhaust gas produced within the first cylinder bank 114 of the host engine 116.

The turbine shroud 136 defines a fluid expansion flow path 146 between a turbine inlet 148 and a turbine exit 150. Within the fluid expansion flow path 146, a turbine inlet stream 152 (which comprises working fluid at a relatively greater pressure relative to the pressure of the working fluid at the turbine exit 150) expands to form a turbine exit stream 154 (which comprises working fluid at a relatively lesser pressure relative to the pressure of the working fluid at the turbine inlet 148) at the turbine exit 150. While the turbine inlet stream 152 flows (and expands) from the turbine inlet 148 to the turbine exit 150, the working fluid which the turbine inlet stream 152 and the turbine exit stream 154 comprise interacts with blades 156 attached to the turbine wheel 130 so as to perform work on the turbine wheel 130. The work performed on the turbine wheel 130 is realized as a torque delivered to the turbine output shaft 126, which may be used for driving the compressor shaft 132. To facilitate expansion of the working fluid in the turbine, an inlet area 158 of the fluid expansion flow path 146 at the turbine exit 150 is greater than an exit area 160 of the fluid expansion flow path 146 at the turbine inlet 148.

The inlet plenum 134 configured for accumulating working fluid (comprising at least a portion of the primary stream 144) to form a turbine inlet stream 152. The inlet plenum 134 is also configured for delivering the turbine inlet stream 152 to the turbine inlet 148. Accordingly, the inlet plenum 134 is in fluid communication with the turbine inlet 148. The crossover flange 106 defines a secondary port 162 that provides fluid communication between the inlet plenum 134 and the crossover duct 120. As discussed more fully below, working fluid may be delivered to the inlet plenum 134 or drawn from the inlet plenum 134 via the secondary port 162 defined within the crossover flange 106.

In an exemplary embodiment, the inlet plenum 134 includes a mixer 164 configured for receiving the primary stream 144 from the primary inlet port 140, for receiving a secondary stream 166 of working fluid from the secondary port 162, and for combining the primary stream 144 with the secondary stream 166 to form the turbine inlet stream 152. Accordingly, the primary turbine housing 100 is configured for accepting the secondary stream 166 via the secondary port 162 defined within the crossover flange 106. Thus, where the primary turbine housing 100 is to be operated as a primary turbine in a parallel sequential charging system 180, the secondary port 162, in connection with the mixer 164, facilitates the addition of the secondary stream 166 of working fluid to the turbine inlet stream 152.

In another exemplary embodiment, the inlet plenum 134 includes a crossover splitter 168 configured for receiving the primary stream 144 from the primary inlet port 140, and for extracting some or all of the working fluid from the primary stream 144 to form the secondary stream 166, with the remainder of the working fluid forming the turbine inlet stream 152. The crossover splitter 168 is configured for delivering the secondary stream 166 to the crossover duct 120 via the secondary port 162. Thus, where the secondary turbine housing 182 is to be operated in connection with a secondary turbine in a parallel sequential charging system 180, the secondary port 162, in connection with the crossover splitter 168, facilitates the extraction of the secondary stream 166 of working fluid from the turbine inlet stream 152 for delivery, via the crossover duct 120, to another turbine. In an exemplary embodiment, the secondary turbine is housed in the secondary turbine housing 182, which is coupled to the primary turbine housing 100 and which is functionally equivalent to the primary turbine housing 100.

Figure 3:
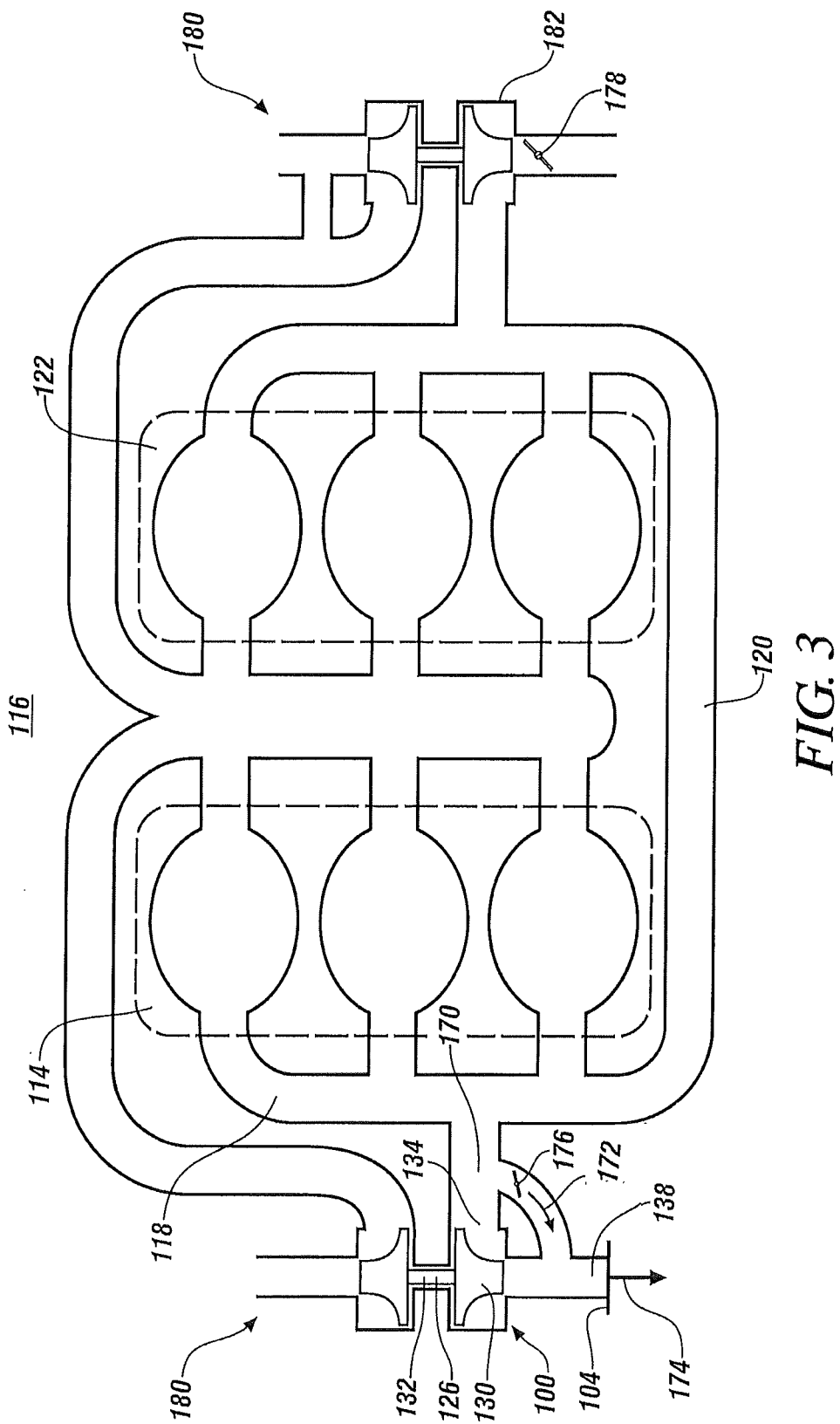
FIG. 3 is a schematic drawing showing the flow paths of an exemplary parallel-sequential turbo-charging system.

Referring to FIG. 3, in yet another exemplary embodiment, the inlet plenum 134 also includes a turbine bypass splitter 170 configured for scavenging some or all of the turbine inlet stream 152 to form a waste stream 172 and for delivering the waste stream 172 to the discharge vent 138 for combination with the turbine exit stream 154 to form the discharge stream 174. A waste gate 176 is disposed in the turbine bypass splitter 170, and the waste gate 176 is configured for regulating a rate of flow of the waste stream 172.

The discharge vent 138 is in fluid communication with the turbine exit 150 and is configured for receiving the turbine exit stream 154 from the turbine exit 150 to form a discharge stream 174. In an exemplary embodiment, a turbine isolation valve 178 is disposed in the turbine exit stream 154 of exhaust gas, downstream from the turbine exit 150. The turbine isolation valve 178 is configured for regulating a rate of flow of the turbine exit stream 154.

In an exemplary embodiment, a charging system 180 for a host engine 116 having a first cylinder bank 114 and a second cylinder bank 122 includes a primary turbine housing 100 and a secondary turbine housing 182. Each of the primary turbine housing 100 and the secondary turbine housing 182 includes an exhaust port flange 102, a turbine discharge flange 104, a crossover flange 106, and a bearing support ring 108. In addition, each of the primary turbine housing 100 and the secondary turbine housing 182 defines an inlet plenum 134, a turbine shroud 136, and a discharge vent 138. A crossover duct 120 is mechanically coupled to the primary turbine housing 100 and the secondary turbine housing 182, and is configured to provide for fluid coupling between the primary turbine housing 100 and the secondary turbine housing 182.

In accordance with this embodiment, the secondary turbine housing 182 is to be operated as a secondary turbine within the charging system 180. Accordingly, the inlet plenum 134 of the secondary turbine housing 182 includes a crossover splitter 168 configured for receiving the primary stream 144 from the primary inlet port 140, and for extracting some or all of the working fluid from the primary stream 144 to form the secondary stream 166, with the remainder of the working fluid forming the turbine inlet stream 152. The crossover splitter 168 is configured for delivering the secondary stream 166 to the crossover duct 120 via the secondary port 162. The crossover duct 120 carries the secondary stream 166 to the primary turbine housing 100.

In accordance with this embodiment, the secondary turbine housing 182 also includes a turbine isolation valve 178 disposed in the turbine exit stream 154, downstream from the turbine exit 150. The turbine isolation valve 178 is configured for regulating a rate of flow of the turbine exit stream 154. When the turbine isolation valve 178 is closed or nearly closed, most, or all, of the working fluid from the primary stream 144 is extracted by the crossover splitter 168 to form the secondary stream 166, with little to none of the working fluid forming the turbine inlet stream 152. When the turbine isolation valve 178 is fully open or nearly fully open, little or none of the working fluid from the primary stream 144 is extracted by the crossover splitter 168 to form the secondary stream 166, with most or all of the working fluid forming the turbine inlet stream 152.

In accordance with this embodiment, the primary turbine housing 100 is to be operated as a primary turbine. Thus, the inlet plenum 134 of the primary turbine housing 100 includes a mixer 164 configured for receiving the primary stream 144 from the primary inlet port 140, for receiving the secondary stream 166 from the crossover duct 120 via the secondary port 162 of the primary turbine housing 100, and for combining the primary stream 144 with the secondary stream 166 to form the turbine inlet stream 152. Accordingly, the primary turbine housing 100 is configured for accepting the secondary stream 166 from the second cylinder bank 122 via the secondary turbine housing 182.

In operation, the waste gate 176 and the turbine isolation valve 178 may be modulated so as to produce desirable operating characteristics of the charging system 180 at various operating speeds of host engine 116. It will be appreciated that a desirable operating characteristic may be optimized by balancing the effects of intake boost pressure and exhaust back-pressure on factors such as engine performance, economy, operability, reliability, and the like. For example, at relatively low operating speeds, it may be desirable to close or nearly close the turbine isolation valve 178 while also closing the waste gate 176. On the other hand, at relatively high operating speeds, it may be desirable to fully open or nearly fully open the turbine isolation valve 178 while regulating the waste gate 176. At moderate operating speeds, it may be desirable to regulate the turbine isolation valve 178 while closing the waste gate 176.

In some applications, it may be advantageous to employ aspects of the present disclosure to create an improved parallel sequential charging system 180. With the continuous development of high power density and wide speed range engines, it may be advantageous to more closely match operation of a turbo-charging system to the engine served by the turbo-charging system. The present disclosure provides a means for improving fuel economy and system responsiveness while reducing emissions at low speeds. In a parallel sequential charging system 180 including two or more turbochargers in parallel, the turbochargers may be placed into service or removed from operation so as to meet the specific needs of the engine as those needs change with movement between engine operation points.

Thus, an exemplary system may improve the ability to match turbocharger operation with the operation of the engine. As a result, efficiency of the turbocharger and boost pressure may both be improved. In an exemplary embodiment, an equivalent turbine flow area may be capable of more than 50% variation in the charging system, significantly improving overall engine system performance while nonetheless retaining advantageously high brake mean effective pressure (BMEP) at low engine speeds. Still further, relative to other twin turbo systems, such as two-stage serial turbocharging systems, the disclosed parallel sequential system facilitates use of smaller turbo-charger components, and provides advantages in terms of packaging and cost. It should be appreciated that these advantages in performance, operability, cost, and packaging will be useful in a range of applications including marine applications, locomotives, military armored vehicles, in addition to internal combustion engines for cars and trucks.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. An internal combustion engine comprising:
a first cylinder bank;
a primary exhaust manifold for conveying exhaust gas produced in the first cylinder bank; and
a primary turbine housing, the primary turbine housing comprising:
an exhaust port flange configured for mechanically coupling the primary turbine housing to the primary exhaust manifold, the primary exhaust manifold being configured to provide exhaust gas produced in the first cylinder bank as a primary source of working fluid;

a turbine discharge flange configured for mechanically coupling the primary turbine housing to an exhaust system;

a crossover flange configured for mechanically coupling the primary turbine housing to a crossover duct; and a bearing support ring configured for mechanically supporting a bearing, on which a turbine output is supported for rotation about its longitudinal axis;

a second cylinder bank;

a second exhaust manifold for conveying exhaust gas produced in the second cylinder bank;

a secondary turbine housing mechanically coupled to the second exhaust manifold;

a first isolation valve disposed in the primary turbine housing to selectively regulate the amount of flow routed therethrough; and a second isolation valve disposed in the secondary turbine housing to selectively regulate the amount of flow routed therethrough;

wherein the crossover duct provides fluid communication between the primary turbine housing and a secondary source of working fluid from the second exhaust manifold;

wherein the primary turbine housing defines an inlet plenum, a turbine shroud, and a discharge vent;

wherein the exhaust port flange defines a primary inlet port that is configured to provide fluid communication between the inlet plenum and the primary source of working fluid;

wherein the primary inlet port is configured to convey a primary stream of the primary source of working fluid to the inlet plenum; and wherein the turbine shroud defines a fluid expansion flow path for expansion of the primary stream of working fluid between a turbine inlet and a turbine exit.

2. An internal combustion engine as in claim 1, wherein the primary exhaust manifold is integrated into a cylinder head associated with the first cylinder bank.

3. An internal combustion engine as in claim 1, wherein the crossover duct is configured to provide a communication path between the primary turbine housing and the second exhaust manifold.

4. An internal combustion engine as in claim 1, wherein the inlet plenum includes a mixer configured for receiving the primary stream of working fluid from the primary inlet port, for receiving a secondary stream of working fluid from the secondary source via a secondary port and for combining the primary stream of working fluid with the secondary stream of working fluid to form a turbine inlet stream.

5. An internal combustion engine as in claim 1:
wherein the inlet plenum includes a crossover splitter configured for receiving the primary stream of working fluid from the primary inlet port, for forming a secondary stream of working fluid comprising at least a portion of the primary stream of working fluid, and for forming a turbine inlet stream comprising at least a portion of the primary stream of working fluid; and
wherein the crossover splitter is configured for delivering the secondary stream of working fluid to the crossover duct via a secondary port.

6. An internal combustion engine as in claim 1, wherein the inlet plenum further comprises a turbine bypass splitter configured for scavenging some or all of a turbine inlet stream to form a waste stream and for delivering the waste stream to the discharge vent for combination with a turbine exit stream to form a discharge stream.

7. An internal combustion engine as in claim 6, further comprising waste gate disposed in the turbine bypass splitter, the waste gate being configured for regulating a rate of flow of the waste stream.

\* \* \* \* \*